Sept. 26, 1939.   F. C. GREULICH   2,174,342

FLEXIBLE COUPLING DEVICE

Filed March 7, 1936

INVENTOR.
FRANK C. GREULICH
BY Kwis Hudson & Kent
ATTORNEYS

Patented Sept. 26, 1939

2,174,342

UNITED STATES PATENT OFFICE 2,174,342

FLEXIBLE COUPLING DEVICE

Frank C. Greulich, Dayton, Ohio

Application March 7, 1936, Serial No. 67,669

7 Claims. (Cl. 64—29)

My invention relates to a power transmitting coupling and, as its principal object, aims to provide an improved device of this character embodying yieldable power transmitting means and having means for automatically releasing the power transmitting connection upon the occurrence of an overload.

Another object of this invention is to provide an improved rotary coupling device embodying flexible power transmitting means and having means for automatically releasing the power transmitting connection upon predetermined flexing of the flexible means.

Still another object of this invention is to provide an improved coupling device having cooperating clutch members normally maintained in driving cooperation with each other by spring means, and wherein a predetermined flexing of the spring means by the load being transmitted permits disengagement of the clutch members.

A further object of this invention is to provide an improved rotary coupling device having substantially aligned shaft members, and cooperating clutch members associated with the shaft members and normally maintained in driving engagement with each other by a spring, and wherein relative movement between one of the clutch members and its shaft member causes such one clutch member to be moved out of engagement with the other clutch member in opposition to the spring.

The invention may be further briefly summarized as consisting in certain novel combinations and arrangements of parts hereinafter described and more particularly set out in the appended claims.

In the accompanying drawing.

In the accompanying drawing, to which more detailed reference will now be made, I have shown what I now regard to be preferred forms of my improved coupling device. Before proceeding with a detailed description of these preferred forms, I wish to briefly explain that my coupling device is intended to be used wherever a coupling is needed to connect driving and driven members.

Figure 1:
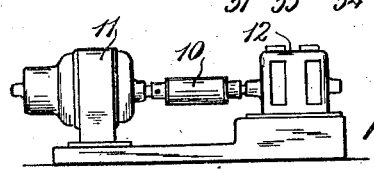
Fig. 1 is a side elevation showing my improved coupling device being used to connect a load to a driving motor.

My improved device is especially useful for connecting driving and driven members where flexibility in the drive is desired for cushioning and vibration eliminating purposes and where automatic release of the driving connection is desirable in the event of overload. This improved device may advantageously be employed for establishing a driving connection between a generator and the internal combustion engine of a motor vehicle, or for use in driving arrangements for cranking or starting purposes. The device is especially suitable to these uses because sudden changes in the load being transmitted are cushioned and absorbed by the flexible means, and suddenly applied overloads are automatically released to prevent damage to the driving or driven apparatus during the period of overload and, after termination of the overload, the normal driving relation is automatically reestablished. One example of use of my improved coupling device is illustrated in Fig. 1 wherein I show my improved coupling device 10 connecting a driving motor 11 with apparatus 12 forming a load to be driven by the motor.

Figure 2:
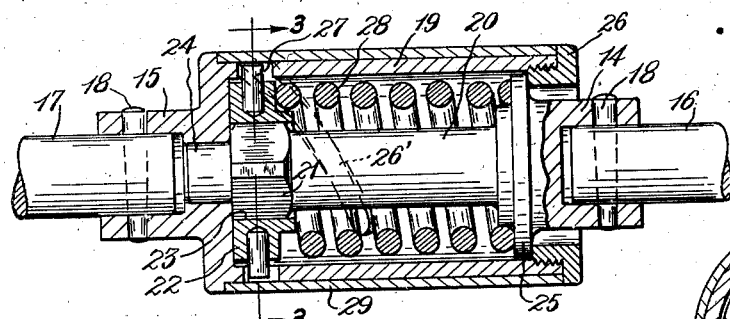
Fig. 2 is a longitudinal sectional view taken through a coupling device embodying my invention.
Figure 3:
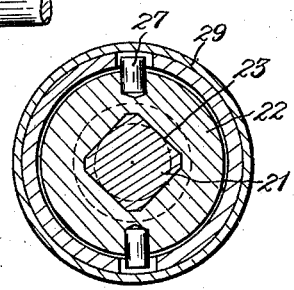
Fig. 3 is a transverse sectional view thereof taken on line 3—3 of Fig. 2.

As shown in Figs. 2 and 3 of the drawing, my improved coupling device may be provided with flange or shaft members 14 and 15 adapted to be connected, respectively, to substantially aligned driving and driven shafts 16 and 17. The members 14 and 15 may be connected to their respective shafts by any suitable means, such as a transverse pin 18 extending therethrough. The member 15 may be constructed with a sleeve or barrel portion 19 which extends toward the shaft 16, and the member 14 may be constructed with a stem portion 20 which extends into the barrel portion and towards the shaft 17.

My improved coupling device also includes cooperating clutch members 21 and 22 which are normally in driving engagement with each other. The clutch member 21 may be a square or other non-circular part carried by the stem portion 20, and the clutch member 22 may be a collar or nut-like part having a square or other non-circular opening 23 in which the clutch member 21 engages. The stem portion 20 may include a projection 24 which extends beyond the clutch member 21 and has rotative bearing engagement in an opening of the shaft member 15. Adjacent the point of connection of the stem portion 20 with the shaft member 14, the latter may be provided with a substantially radially extending annular flange portion 25. One function of this flange portion is to provide bearing engagement with the barrel portion 19 and with the retaining nut 26 thereof, whereby this flange portion and the projection 24 maintain the shaft members 14 and 16 in substantially axial alignment with the shaft members 15 and 17.

The cooperating clutch members 21 and 22 are relatively short as compared with the total axial length of the coupling device, and the engagement between these members is such that the driving connection provided thereby may be disconnected and reestablished by movement of the member 22 axially of the coupling device and relative to the member 21. This axial relative movement of the clutch member 22 may be obtained by an operating connection provided between this member and the barrel part 19. This connection permits relative rotary movement between the barrel part and the clutch member 22 and, when such relative rotary movement occurs, it is utilized to cause axial movement of this clutch member relative to the clutch member 21. An operating connection between the clutch member 22 and the barrel part 19 suitable for the purpose just mentioned may be obtained by providing the barrel part with spiral slots or grooves 26' in which lugs or pins 27 of the clutch member engage. The slots 26' serve as cam members and the pins 27 serve as cam followers so that relative rotary movement between the barrel part and the clutch member causes axial movement of the latter.

Relative rotary and axial movement of the clutch member 22 is resisted by a compression spring 28 which is contained within the barrel part 19 and disposed between the clutch member and the annular flange portion 25. This spring resists movement of the clutch member 22 sufficiently to normally maintain the clutch members 21 and 22 in driving engagement, but yields to absorb shocks and vibrations occurring as the result of sudden changes in the magnitude or direction of the load being transmitted. The characteristics of this spring are preferably such that it will yield to absorb such shocks and vibrations without releasing the driving connection provided by the clutch members 21 and 22, but when an overload occurs it will yield sufficiently to permit enough axial movement of the clutch member 22 to become disengaged from the clutch member 21. When this occurs, the clutch members 21 and 22 and their respective shafts 16 and 17 rotate relatively to each other as long as the overload condition exists. When the overload condition subsides, the spring 28 moves the clutch member 22 in the opposite axial direction and thereby reestablishes its driving connection with the clutch member 21.

If desired, this improved coupling device may be provided with a suitable casing or housing member for retaining lubricant in the barrel part 19 and for excluding water and other foreign substances. This housing member is preferably, though not necessarily, in the form of a sleeve 29 which surrounds the barrel part 19.

Figure 4:
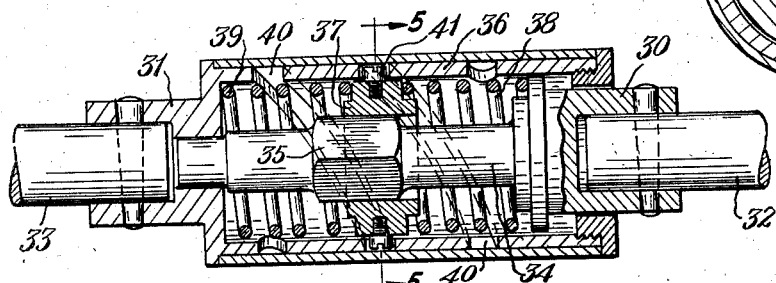
Fig. 4 is a longitudinal sectional view taken through another coupling device embodying my invention.
Figure 5:
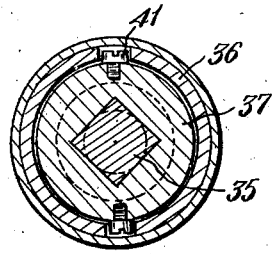
Fig. 5 is a transverse sectional view thereof taken on line 5—5 of Fig. 4.

In Figs. 4 and 5 of the drawing I have shown another embodiment of my invention in the form of a flexible rotary coupling device generally similar to the device of Fig. 2, but which is adapted to the transmission of loads in either direction therethrough, and which provides for cushioning and automatic release of shocks and overloads transmitted in either direction through the device. The coupling device of Figs. 4 and 5 may be provided with coaxially extending shaft members 30 and 31 which are connected, respectively, with driving and driven shafts 32 and 33. The shaft member 30 may have an axially extending stem part 34 which is provided at an intermediate point thereon with a square or other non-circular portion forming a clutch member 35. The shaft member 31 may have an axially extending sleeve or barrel part 36 which surrounds the stem part 34. A clutch member 37 having driving engagement with the clutch member 35 is contained in the barrel part 36 and is normally maintained at an intermediate point thereof and in driving engagement with the clutch member 35, by coil springs 38 and 39 contained in the barrel part on opposite sides thereof.

Provision is made whereby relative rotary movement between the barrel part and the clutch member 37 causes movement of the latter in an axial direction relative to the clutch member 35. This may be obtained by providing the barrel part 36 with helically extending slots or grooves 40 in which projecting pins or screws 41 of the clutch member 37 engage.

With the arrangement just described it will be seen that clockwise rotary movement transmitted through the device in one direction, for example from the shaft 32 to the shaft 33, will cause relative rotary movement between the barrel part 36 and the clutch member 37 resulting in a compression of the spring 38 and axial movement of this clutch member toward the right. If the force being transmitted does not compress the spring 38 sufficiently to release the clutch member 37 from driving engagement with the clutch member 35, the power transmitting connection is not interrupted. If a sudden overload occurs, however, the spring 38 is compressed further and the clutch member 37 is disengaged from the clutch member 35 and the driving connection is thereby interrupted, and relative rotation between the shafts 32 and 33 is permitted while the overload condition continues. When the overload condition is removed the clutch member 37 reengages the clutch member 35 and the power transmitting connection through the device is automatically reestablished. It will be understood, of course, that if the transmission of power is in the reverse direction an overload condition will cause the clutch member 37 to be disengaged from the clutch member 35, but by axial movement in the opposite direction.

Figures 7, 8:
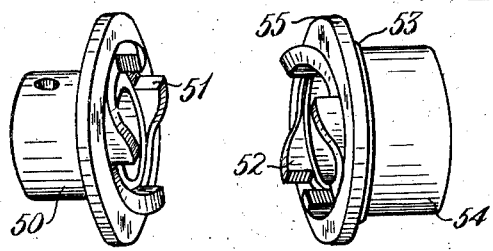
Figs. 7 and 8 are perspective views showing, respectively, the clutch members of the coupling device of Fig. 6.
Figure 6:
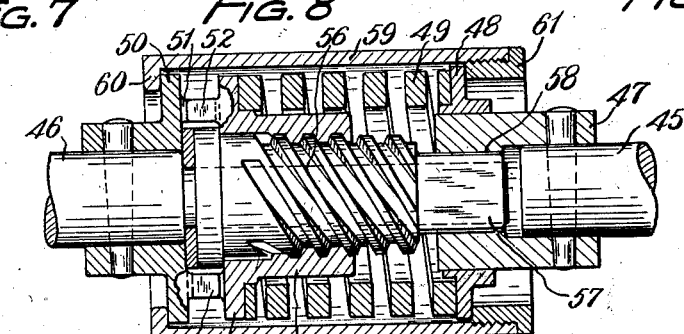
Fig. 6 is a longitudinal sectional view showing still another flexible coupling embodying my invention.

In Figs. 6, 7 and 8 I have shown my invention embodied in a flexible coupling device which, from the standpoint of manufacture, may have advantages over the device illustrated in Fig. 2. The principle of operation is, however, substantially the same.

The device of Fig. 6 is adapted to be applied to substantially axially aligned shafts 45 and 46 and may include a shaft member 47 connected with the shaft 45 and having an annularly extending flange part 48 forming a seat for a compression spring 49. A clutch member 50 may be connected with the shaft 46 and may have an arcuately extending series of teeth 51 for releasable driving connection with a similar arcuately extending series of teeth 52 carried by a second clutch member 53. This second clutch member is provided with an internally threaded sleeve or nut part 54 which extends axially of the device and toward the shaft member 47. An annular flange 55 carried by the clutch member 53 provides a seat for the opposite end of the coil spring 49. A drive screw 56 extending axially of the device engages the internally threaded nut portion 54 of the clutch member 53, and has driving connection with the shaft member 47 by engagement of a square or other non-circular projection 57 in a correspondingly shaped opening 58 of this shaft member. The various parts may be retained in the assembled relation shown in Fig. 6 by providing the device with a suitable housing, preferably in the form of an axially extending sleeve or barrel 59 having a retaining flange 60 for cooperation with the clutch member 50 and a retaining nut 61 for cooperation with the flange portion 48.

In the operation of the flexible coupling device just described the coil spring 49 normally maintains the teeth of the clutch members 50 and 53 in driving engagement with each other, but is adapted to be flexed more or less as the result of load variations causing relative rotary movement between the drive screw 56 and the nut portion 54 of the clutch member 53. Such load variations are normally cushioned by the spring 49 without releasing the driving engagement between the clutch members 50 and 53 but, upon the occurrence of an overload condition, the spring 49 will be flexed to a greater extent and the clutch member 53 will be moved axially a distance to release its teeth 52 from driving engagement with the teeth 51 of the clutch member 50. When this occurs, relative rotation between the shafts 45 and 46 is permitted until the condition of overload is removed, whereupon the spring 49 will automatically cause the driving connection between the clutch members to be reestablished.

From the foregoing description and accompanying drawing it will now be readily understood that I have provided an improved flexible coupling device of reliable and simplified construction which, during operation, will absorb shocks and vibrations resulting from sudden changes in magnitude or direction of power transmission, and which will automatically release the driving connection when an overload occurs and automatically restore the driving connection when the overload condition is removed. My improved device is of very economical construction, and when used to connect various machines and devices effectively prevents damage thereto as the result of shocks and overloads.

While I have illustrated and described my improved flexible coupling device in a somewhat detailed manner it will be understood, of course, that I do not wish to be limited to the precise details of construction and arrangements of parts herein disclosed, but regard my invention as including such changes and modifications as do not constitute a departure from the spirit of the invention and the scope of the appended claims.

Having thus described my invention, I claim:

1. In a rotary combined cushioning and overload release device a pair of substantially aligned shaft members, a hollow casing having one end thereof mounted on one of said shaft members and also having an internal shoulder adjacent its other end a clutch member connected with the other of the shaft members and disposed substantially coaxially in the hollow casing, said clutch member being rotatable in the casing and having means engageable with said internal shoulder for limiting relative axial shifting outwardly of the casing, a second clutch member normally having driving engagement with the first mentioned clutch member but movable axially out of engagement therewith, cooperating cam elements connecting the second clutch member with said one shaft member whereby relative rotary movement therebetween causes movement of the second clutch member axially relative to the first mentioned clutch member, and spring means contained in the casing and acting on said second clutch member to resist the relative movement thereof but permitting separation of the clutch members when the load being transmitted exceeds a predetermined value, said spring means, clutch members and cam elements having characteristics providing for absorption of shocks and vibrations during normal load transmitting functions of the device.

2. In a rotary combined cushioning and overload release device a pair of substantially aligned shaft members, a hollow casing having one end thereof connected with one of said shaft members and also having an internal shoulder adjacent its other end, a clutch member connected with the other of the shaft members and disposed substantially coaxially in the hollow casing, said clutch member being rotatable in the casing and having means engageable with said internal shoulder for limiting relative axial shifting outwardly of the casing, a second clutch member normally having driving engagement with the first mentioned clutch member but movable axially out of engagement therewith, cooperating cam elements connecting the second clutch member with said one shaft member whereby relative rotary movement therebetween in either direction causes movement of the second clutch member axially relative to the first clutch member, and springs contained in the casing and acting on the second clutch member to resist relative axial movement thereof in either direction but permitting separation of the clutch members when the load being transmitted exceeds a predetermined value, said springs, clutch members and cam elements having characteristics providing for absorption of shocks and vibrations during normal load transmitting functions of the device.

3. In a rotary coupling device, a shaft member having a hollow part connected therewith and provided with a cam groove, a member in said hollow part and having means cooperating with said cam groove whereby relative rotary movement between the hollow part and said member causes axial movement of the latter, a second shaft member having a part extending into said hollow part and normally drivingly engaged by the axially movable member, and spring means in said hollow part and acting on the axially movable member to yieldingly maintain the same in driving engagement with the extending part of the second shaft member but permitting disengagement of such member and part when the load being transmitted exceeds a predetermined value, said spring means and cam groove having characteristics providing for relative movement between said hollow part and said member for absorption of shocks and vibrations during normal load transmitting functions of the coupling.

4. In a rotary coupling device, a shaft member having a hollow part connected therewith and provided with a helical cam groove, a member in said hollow part at an intermediate point thereof and having means cooperating with said cam groove whereby relative rotary movement between the hollow part and said member in either direction causes axial movement of the latter, a second shaft member having a part extending into said hollow part and normally drivingly engaged by the axially movable member, and springs in said hollow part on opposite sides of the axially movable member to yieldingly hold the latter in driving engagement with said extending part but permitting disengagement of said member and part when the load being transmitted exceeds a predetermined value, said springs and cam groove having characteristics providing for relative movement between said hollow part and said member for absorption of shocks and vibrations during the normal load transmitting functions of the coupling.

5. In a rotary coupling device, a shaft member having a hollow part connected therewith and provided with a cam groove, a member in said hollow part and having means cooperating with said cam groove whereby relative rotary movement between the hollow part and said member causes axial movement of the latter, such axially movable member having a relatively short non-circular axial opening, a second shaft member extending into said hollow part and having a relatively short non-circular axial part normally drivingly engaged by the axially movable member, and spring means in said hollow part and acting on the axially movable member to yieldingly maintain the same in driving engagement with the extending part of the second shaft member but permitting disengagement of such member and part when the load being transmitted exceeds a predetermined value, said spring means and cam groove having characteristics providing for relative movement between said hollow part and said member for absorption of shocks and vibrations during the normal load transmitting functions of the coupling.

6. A flexible coupling and overload release device comprising an elongated housing having openings at opposite ends and internal annular shoulders adjacent such openings, a pair of substantially aligned shaft members extending into the housing at opposite ends thereof and held against outward axial shifting by said shoulders, one of said members having clutch elements thereon, a screw extending axially of the housing and connected with the other of said members, a nut having threaded engagement with said screw and also having clutch elements thereon engageable with the clutch elements of said one member, and a spring engaging said other member and said nut and adapted to normally hold said clutch elements in engagement.

7. A flexible coupling and overload release device comprising an elongated housing having openings at opposite ends and internal annular shoulders adjacent such openings, a pair of substantially aligned shaft members extending into the housing at opposite ends thereof and held against outward axial shifting by said shoulders, one of said members having clutch elements thereon and an axial extension portion and the other member having a non-circular opening therein, a screw mounted on said extension portion and having a non-circular portion engaging in said non-circular opening, a nut having threaded engagement with said screw and also having clutch elements engageable with the clutch elements of said one member, means on said nut providing a spring seat, and a coil spring extending axially of the housing around said nut and engaging said other member and said spring seat, said spring being adapted to normally hold said clutch elements in engagement but yielding to absorb shocks and to permit separation of said clutch elements in the event of overload.

FRANK C. GREULICH.